(12) United States Patent
Lim et al.

(10) Patent No.: US 9,576,189 B2
(45) Date of Patent: Feb. 21, 2017

(54) METHOD AND APPARATUS FOR CONTROLLING VEHICLE USING MOTION RECOGNITION WITH FACE RECOGNITION

(71) Applicant: CHEMTRONICS CO., LTD., Sejong-si (KR)

(72) Inventors: Yong-Je Lim, Seongnam-si (KR); See-Wook Kim, Seongnam-si (KR)

(73) Assignee: CHEMTRONICS CO., LTD., Sejong-si (KR)

( * ) Notice: Subject to any disclaimer, the term of this patent is extended or adjusted under 35 U.S.C. 154(b) by 0 days.

(21) Appl. No.: 14/836,912

(22) Filed: Aug. 26, 2015

(65) Prior Publication Data

US 2016/0063315 A1    Mar. 3, 2016

(30) Foreign Application Priority Data

Aug. 27, 2014    (KR) .......................... 10-2014-0112608

(51) Int. Cl.
*G06F 7/00* (2006.01)
*G06K 9/00* (2006.01)
(Continued)

(52) U.S. Cl.
CPC ............. *G06K 9/00288* (2013.01); *B60Q 1/04* (2013.01); *G06K 9/00221* (2013.01); *G06K 9/00268* (2013.01); *G06K 9/00335* (2013.01); *G06K 9/00791* (2013.01); *G06T 7/20* (2013.01); *H04N 5/44* (2013.01); *G06K 9/00302* (2013.01)

(58) Field of Classification Search
USPC .. 701/23, 27, 36, 40–42, 45, 57, 58, 83, 84, 701/301, 302; 340/995.1, 995.13, 995.19, 340/995.21, 995.23
See application file for complete search history.

(56) References Cited

U.S. PATENT DOCUMENTS 6,498,970 B2    12/2002    Colmenarez et al.
2006/0261931 A1    11/2006    Cheng
(Continued)

FOREIGN PATENT DOCUMENTS

KR    1020080042357 A    5/2008
KR    100887688 B1    3/2009
(Continued)

OTHER PUBLICATIONS

European Search Report mailed on Feb. 25, 2016 corresponding to European Patent Application 15182736.7.

*Primary Examiner* — Muhammad Shafi
(74) *Attorney, Agent, or Firm* — Hauptman Ham, LLP

(57) ABSTRACT

Provided is a vehicle control apparatus including an image obtaining part that obtains an image of outside of a vehicle; a face recognizing part that finds and tracks a face of a person from an image obtained by the image obtaining part based on feature elements human faces and extracts feature information regarding a face of a person; a face authenticating part that compares the feature information extracted by the face recognizing part to feature information regarding faces of persons registered in advance and, if a difference therebetween is less than or equal to a critical value, authenticates that the recognized face as a registered face; the motion recognizing part that, when authentication is completed by the face authenticating part, recognizes a motion; and a control part that recognizes a motion of a face-recognized and face-authenticated person and performs a set function.

19 Claims, 3 Drawing Sheets

(51) Int. Cl.
    *G06T 7/20*     (2006.01)
    *B60Q 1/04*     (2006.01)
    *H04N 5/44*     (2011.01)

(56) References Cited

U.S. PATENT DOCUMENTS

| | | | |
|---|---|---|---|
| 2011/0316964 A1* | 12/2011 | Nakanishi | H04N 7/142 348/14.02 |
| 2013/0247175 A1* | 9/2013 | Nechyba | G06F 21/32 726/19 |
| 2013/0249669 A1 | 9/2013 | Zwiener | |
| 2014/0241594 A1* | 8/2014 | Ikeda | G06F 3/005 382/118 |

FOREIGN PATENT DOCUMENTS

| | | |
|---|---|---|
| KR | 1020110040562 A | 4/2011 |
| KR | 1020120063785 A | 6/2012 |
| KR | 101165106 B1 | 7/2012 |
| KR | 1020130106640 A | 9/2013 |

* cited by examiner

METHOD AND APPARATUS FOR CONTROLLING VEHICLE USING MOTION RECOGNITION WITH FACE RECOGNITION

CROSS REFERENCE TO RELATED APPLICATION

This application claims the benefit of Korean Patent Application No. 10-2014-0112608, filed on Aug. 27, 2014, entitled "METHOD AND APPARATUS FOR CONTROLLING VEHICLE USING MOTION RECOGNITION WITH FACE RECOGNITION", which is hereby incorporated by reference in its entirety into this application.

TECHNICAL FIELD

The present invention relates to a vehicle control, and more particularly, a method and an apparatus for controlling a vehicle via face recognition and motion recognition by recognizing and authenticating face of a person outside the vehicle and recognizing a motion of the person, thereby providing various services including controlling the vehicle.

BACKGROUND ART

Recently, various types of cameras are being installed on vehicles, and various techniques utilizing the cameras are being researched. Principally, techniques related to driving safety of a vehicle are being researched.

Particularly, in the field of utilizing face recognition, there are many techniques for providing driving conveniences, e.g., a technique for detecting drowsiness or abnormalities of a driver, a technique for confirming a particular driver and adjusting position of a driver's seat in correspondence to the driver.

The Korean Patent Laid-Open Publication No. 10-2011-0040562 (Personalized Service and Apparatus and Method for Using Car) discloses a camera, which is installed on a door next to a driver's seat of a vehicle and captures images of objects outside the vehicle, and a processor, which determines whether an object is a driver registered to the vehicle based on a captured image and, if the object is a driver registered to the vehicle, provides a personalized services to the registered driver by setting up the vehicle according to set values corresponding to the registered driver. Therefore, if a driver is registered to the vehicle in advance, the vehicle may be set up according to set values corresponding to the registered driver, thereby providing a personalized service to the registered driver.

According to the above-stated patent, a time period elapsed for providing a personalized service by determining whether a driver is a registered driver by using an image of the driver captured before the driver enters a vehicle may be reduced. However, services that may be provided according to the above-stated patent include simple re-adjustments of set values according to drivers, such as adjustment of position of a driver's seat. Furthermore, since a high performance system is required therefor, it is difficult to apply the technical configuration to vehicles in the low-price range.

DETAILED DESCRIPTION OF THE INVENTION

Technical Problem

The present invention provides a method and an apparatus for controlling a vehicle via face recognition and motion recognition by recognizing and authenticating face of a person outside a vehicle and recognizing a motion to provide various services including controlling of the vehicle inexpensively via a low performance system.

Technical Solution

According to a first aspect of the present invention, there is provided a vehicle control apparatus including an image obtaining part that obtains an image of outside of a vehicle; a face recognizing part that finds and tracks a face of a person from an image obtained by the image obtaining part based on feature elements human faces and extracts feature information regarding a face of a person; a face authenticating part that compares the feature information extracted by the face recognizing part to feature information regarding faces of persons registered in advance and, if a difference therebetween is less than or equal to a critical value, authenticates that the recognized face as a registered face; the motion recognizing part that, when authentication is completed by the face authenticating part, recognizes a motion; and a control part that recognizes a motion of a face-recognized and face-authenticated person and performs a set function.

According to a second aspect of the present invention, there is provided a vehicle control method including storing faces and motions of persons; when an image is obtained via an image obtaining part, recognizing, by a face recognizing part, a face; authenticating, by a face authenticating part, the face by comparing feature information extracted by the image obtaining part to feature information regarding faces of persons stored in a storage part in advance; when the authentication is completed by the face authenticating part, recognizing, by a motion recognizing part, a motion of a person; and recognizing, by a control part, a motion of a face-recognized and face-authenticated person and controlling to perform a set function based on the motion recognized by the motion recognizing part.

Advantageous Effects

According to the present disclosure, the following effects may be expected.

First, when face of a person located outside a vehicle is recognized and authenticated as a person registered in advance, a vehicle may be controlled in a pre-set advance with a face or a body motion registered by the corresponding person in advance.

Second, a driver may easily control a vehicle or receive various services even when the driver is outside the vehicle, without using an external device.

MODES OF THE INVENTION

Hereinafter, exemplary embodiments will be described in detail with reference to accompanying drawings.

In addition, although the terms used in the present disclosure are selected from generally known and used terms, some of the terms mentioned in the description of the present disclosure have been selected by the applicant at his or her discretion, the detailed meanings of which are described in relevant parts of the description herein. Furthermore, it is required that the present disclosure is understood, not simply by the actual terms used but by the meaning of each term lying within. In the following description of the present disclosure, the detailed description of known functions and configurations incorporated herein is omitted when it may make the subject matter of the present disclosure rather unclear.

Figure 1:
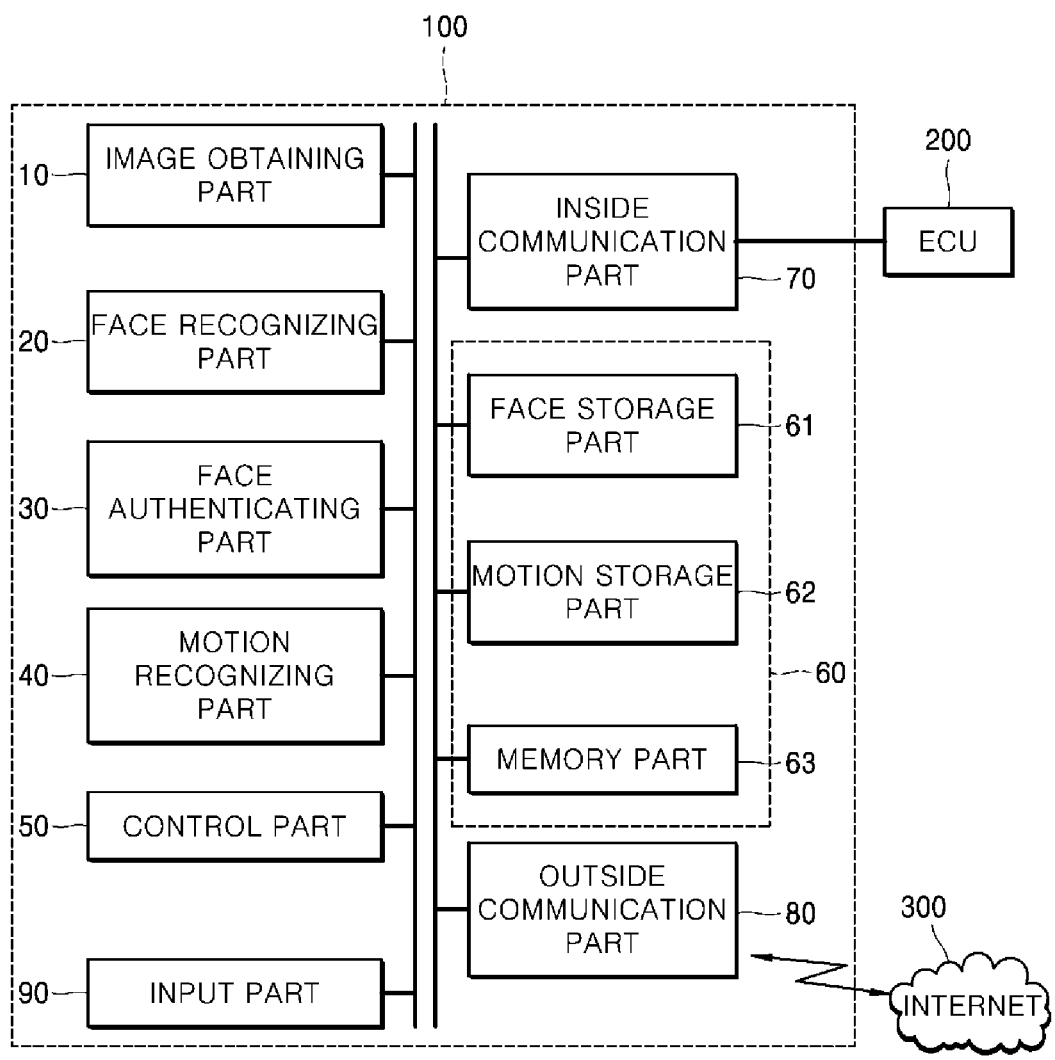
FIG. 1 is a block diagram for describing a vehicle control apparatus using face recognition and motion recognition according to the present disclosure.
Figure 2:
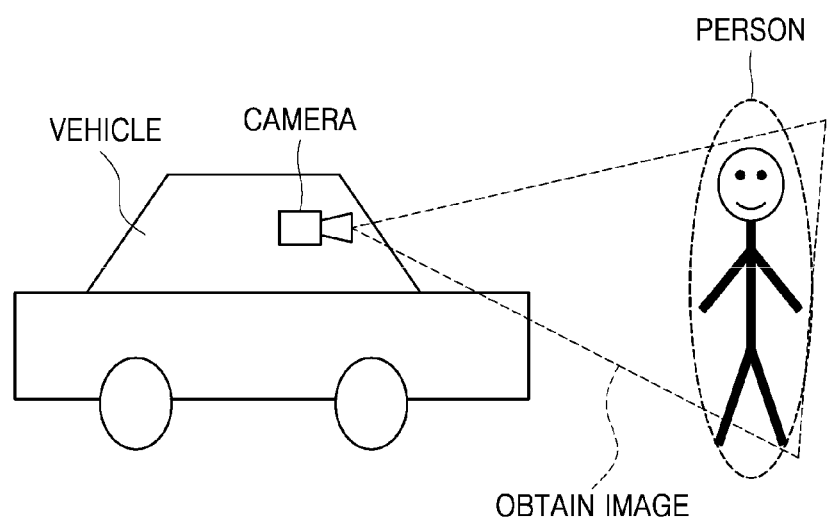
FIG. 2 is a diagram for describing an example of image capturing operations in a vehicle control process using face recognition and motion recognition according to the present disclosure.

FIG. 1 is a block diagram for describing a vehicle control apparatus using face recognition and motion recognition according to the present disclosure, and FIG. 2 is a diagram for describing an example of image capturing operations in a vehicle control process using face recognition and motion recognition according to the present disclosure.

As shown in FIG. 1, the vehicle control apparatus according to the present disclosure consists of an image obtaining part 10, a face recognizing part 20, a face authenticating part 30, a motion recognizing part 40, a control part 50, a storage part 60, an inside communication part 70, an outside communication part 80, and an input part 90.

Here, the image obtaining part 10 obtains an image of outside of a vehicle, removes noises from an input image, and converts the input image to a binary image, thereby minimizing effects from disturbances outside the vehicle. The image obtaining part 10 may be a camera installed inside a vehicle as shown in FIG. 2, where a face image and a motion image regarding a person outside the vehicle is obtained via the camera. Here, although FIG. 2 shows that a forward image of a vehicle is obtained, an image of any direction may be input without being limited to a forward image, a backward image, a leftward image, and a rightward image.

The face recognizing part 20 is a part for finding and tracking a face of a person from an input image based on feature elements constituting human faces and extracts feature information regarding a face of a person. Here, if a plurality of faces exists in the input image, the face recognizing part 20 extracts and tracks feature information regarding all of the plurality of faces.

The face authenticating part 30 compares the feature information extracted by the face recognizing part 20 to feature information regarding faces of persons registered in advance and, if a difference therebetween is less than or equal to a critical value, authenticates that the recognized face as a registered face. Furthermore, if a plurality of faces is recognized by the face recognizing part 20, each of the plurality of faces is individually authenticated.

When authentication is completed by the face authenticating part 30, the motion recognizing part 40 stands by for a motion recognition, where the motion recognizing part 40 recognizes a change of a face of an authenticated person or a change of a body motion of the authenticated person and determines whether a recognized motion is identical to an appointed motion that is input in advance. Here, completion of motion recognition may be notified or, if no motion is recognized (misrecognition), a motion may be requested again. The request may be performed via a lamp or a speaker connected to an onboard computer 200 of a vehicle. Furthermore, if a plurality of faces is authenticated by the face authenticating part 30, motions may be individually recognized with respect to the respective faces, thereby recognizing motions of a plurality of authenticated persons and interconnecting information of the recognitions. Examples of motions may include changes in facial expressions, such as eye-blinking and mouth shape changes, and body motions, such as hand-clapping shapes and a number of times for hand-clapping, feet-stamping shapes and a number of times for feet-stamping, formation of a circle by using arms, outstretching of left and right arms.

The control part 50 is a part for recognizing a face, recognizing a motion of an authenticated person, and performing a set function, is connected to the onboard computer (ECU) 200 via the inside communication part 70 (e.g., CAN, OBD-II, etc.) or connected to an outside network (wired/wireless internet 300) via the outside communication part 80 (e.g., 3G, LTE, Wi-Fi, BT, etc.), and transmits and receives data for performing functions based on motion recognition.

Meanwhile, the storage part 60 consists of a face storage part 61, a motion storage part 62, and a memory part 63. Here, the face storage part 61 registers and stores faces, and the motion storage part 62 stores motions of persons based on stored faces and functions associated with the motions. The memory part 63 stores programs required to control the vehicle control apparatus 100 and identification information (e.g., phone numbers, e-mail addresses, etc.) required to transmit data via the outside communication part 80. Furthermore, since the image obtaining part 10 is arranged, the vehicle control apparatus 100 may be used as a vehicle black-box. In this case, a separate micro SD card may be mounted. Here, the vehicle control apparatus 100 may be set to operate in black-box mode while a vehicle is moving.

The input part 90 is used to turn the vehicle control apparatus 100 on and off, input and store a face recognition command, input and store a motion recognition command, and to input information regarding a recipient (a phone number or an e-mail address) of data to be transmitted by the outside communication part 80 via the internet 300. Here, a face and a motion are input via the image obtaining part 10 and stored in the face storage part 61 and the motion storage part 62, respectively. The input part 90 may be configured as a touch input part on a touch screen.

Meanwhile, any of available functions of vehicles including opening/closing of a vehicle door and a trunk, turning on/off of vehicle headlights and lamps inside/outside the vehicle, a function for capturing a currently parked location via a camera (image obtaining part) and transmitting a captured image to a mobile phone corresponding to a registered phone number, turning on/off of a vehicle black-box, etc. may be controlled via particular motions registered in advance. Meanwhile, the vehicle control apparatus 100 may upgrade or update programs via the internet 300 and the outside communication part 80, thereby adding new services.

Figure 3:
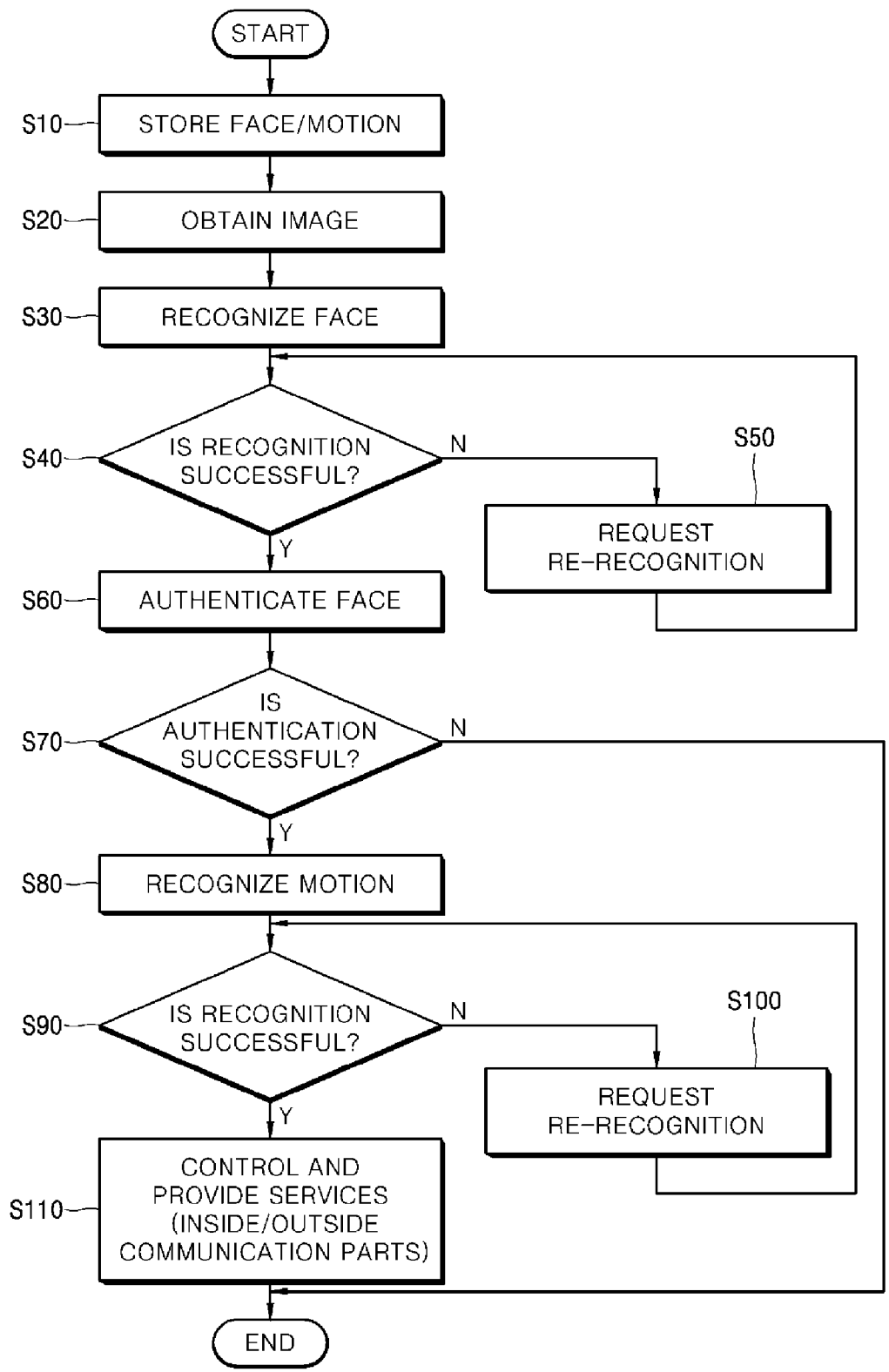
FIG. 3 is a flowchart for describing a method of controlling a vehicle using face recognition and motion recognition according to the present disclosure.

FIG. 3 is a flowchart for describing a method of controlling a vehicle using face recognition and motion recognition according to the present disclosure.

As shown in FIG. 3, in the method of controlling a vehicle using face recognition and motion recognition, a face and a motion of a person are stored (operation S10). Here, if a command for inputting and storing a face and a motion of a person is input via the input part 90, an image is obtained via the image obtaining part 10, where the face and the motion are respectively recognized and authenticated by the face authenticating part 30 and the motion recognizing part 40 and are stored in the storage part 60.

Meanwhile, after the face and the motion are stored, if an image is obtained via the image obtaining part 10 (operation S20), the face recognizing part 20 extracts feature information regarding a face from the obtained input image to find and track a face of a person from the input image based on feature elements. Here, if a plurality of faces exists in the input image, the face recognizing part 20 extracts and track feature information regarding all of the faces simultaneously and recognizes the faces (operation S30).

Next, it is determined whether face recognition is successful (operation S40).

If it is determined as a result of the determination in the operation S40 that face recognition is not successful, re-recognition is requested (operation S50). Here, if the extraction of feature information is not successful, re-recognition is requested.

However, if it is determined as a result of the determination in the operation S40 that face recognition is successful, the face authenticating part 30 compares the feature information extracted by the face recognizing part 20 to feature information regarding faces of persons stored in (registered to) the storage part 60 in advance and, if a difference therebetween is less than or equal to a critical value, authenticates that the recognized face as a registered face. Furthermore, if a plurality of faces is recognized, each of the plurality of faces is individually authenticated (operation S60).

It is determined whether face authentication is successful (operation S70).

If it is determined as a result of the determination in the operation S70 that the authentication is not successful, the recognized face is not a stored face of a person, and thus the overall process is terminated.

However, if it is determined as a result of the determination in the operation S70 that the authentication is successful, if the authentication is completed by the face authenticating part 30, the motion recognizing part 40 ready for motion recognition recognizes a change of a face of an authenticated person or a change of a body motion of the authenticated person and determines whether a recognized motion is identical to an appointed motion that is input in advance, that is, a motion stored in the storage part 60 (operation S80). Here, completion of motion recognition may be notified or, if no motion is recognized (misrecognition), a motion may be requested again.

Next, it is determined whether motion recognition is successful (operation S90).

If it is determined as a result of the determination in the operation S90 that the motion recognition is not successful, re-recognition is requested (operation S100). Here, if a recognized motion is not a stored motion or a difference between a recognized motion and a stored motion is less than or equal to a critical value required for motion recognition, re-recognition may be requested due to failure of motion recognition.

However, if it is determined as a result of the determination in the operation S90 that the motion recognition is successful, the control part 50 recognizes a motion of a face-recognized and face-authenticated person and transmits data to the onboard computer (ECU) 200 via the inside communication part 70 or transmit data to the internet 300 via the outside communication part 80 to perform functions based on motion recognition.

The onboard computer 200 may be controlled via the inside communication part 70 to perform any of available functions of vehicles including opening/closing of a vehicle door and a trunk, turning on/off of vehicle headlights and lamps inside/outside the vehicle, and turning on/off of a vehicle black-box, etc. Furthermore, functions including a function for capturing a currently parked location via a camera (image obtaining part) and transmitting a captured image to a mobile phone corresponding to a registered phone number, a function for transmitting video data/audio data stored in a memory of a vehicle black-box to a mobile phone, etc. may be performed via the outside communication part 80 based on motion recognition. Since the vehicle control apparatus 100 includes a camera for capturing images and the storage part 60, the vehicle control apparatus 100 may also be used as a vehicle black-box, and thus the above-stated technical configuration may be easily embodied by one of ordinary skill in the art.

While the present disclosure has been particularly shown and described with reference to preferred embodiments thereof, it will be understood by those skilled in the art that various changes in form and details may be made therein without departing from the spirit and scope of the present disclosure as defined by the appended claims. The preferred embodiments should be considered in descriptive sense only and not for purposes of limitation. Therefore, the scope of the present disclosure is defined not by the detailed description of the present disclosure but by the appended claims, and all differences within the scope will be construed as being included in the present disclosure. In the drawings, the thicknesses of some elements are exaggerated or reduced for clarity.

The invention claimed is:

1. A vehicle control apparatus comprising:
   an image obtaining part configured to obtain an image of an area outside a vehicle;
   a face recognizing part configured to:
      find and track a face of a person outside the vehicle, the face of the person outside the vehicle being in the image obtained by the image obtaining part, the face recognizing part being configured to find the face of the person outside the vehicle and track the face of the person outside the vehicle based on feature elements of human faces; and
      extract feature information regarding the face of the person outside the vehicle;
   a face authenticating part configured to:
      compare the feature information extracted by the face recognizing part to feature information regarding faces of one or more persons registered in advance, the feature information regarding the faces of the one or more persons registered in advance being stored in a non-transitory computer readable storage medium; and
      authenticate the face of the person outside the vehicle as being a registered face if a first difference between the feature information extracted by the face recognizing part and the feature information regarding the faces of the one or more persons registered in advance is less than or equal to a first critical value;
   a motion recognizing part configured to recognize a motion of the person outside the vehicle if the face of the person outside the vehicle is authenticated as being a registered face; and
   a control part configured to:
      compare the motion recognized by the motion recognizing part to a motion registered in advance, the motion registered in advance being stored in the memory;
      cause a specific function of the vehicle to be performed if a second difference between the motion recognized by the motion recognizing part and the motion stored in advance is greater than a second critical value, the specific function of the vehicle comprising one or more of opening a vehicle door, closing the vehicle door, opening a vehicle trunk, or closing the vehicle trunk; and cause the motion recognizing part to request the person outside the vehicle having the registered face to show the motion again if the second difference is less than or equal to the second critical value.

2. The vehicle control apparatus of claim 1, wherein the image obtaining part is configured to;

remove noise from the image of the area outside the vehicle; and convert the image of the area outside the vehicle to a binary image.

3. The vehicle control apparatus of claim 1, the face recognizing part is further configured to:

find and track faces of a plurality of people outside the vehicle if the image obtained by the image obtaining part includes a plurality of faces; and extract feature information regarding all of the faces of the plurality of people of people outside the vehicle.

4. The vehicle control apparatus of claim 3, the face authenticating part is further configured to:

individually compare the feature information of all of the faces of the plurality of people outside the vehicle if a plurality of faces exist in the image obtained by the image obtaining part to the feature information regarding the faces of one or more persons registered in advance; and authenticate all of the faces individually.

5. The vehicle control apparatus of claim 1, wherein the motion recognizing part is further configured to recognize a change of the face of the person outside the vehicle authenticated as having a registered face or a change of a body motion of the person outside the vehicle authenticated as having a registered face.

6. The vehicle control apparatus of claim 5, wherein the motion recognizing part is configured to notify completion of the motion recognition.

7. The vehicle control apparatus of claim 1, wherein the motion recognizing part is configured to detect motions comprising changes in facial expressions including changes of shapes of eyes and a mouth and changes of body motions including changes of shapes of palms, hands, and feet.

8. The vehicle control apparatus of claim 1, further comprising:

an inside communication part configured to transmit data to an onboard computer (ECU) of the vehicle for performing a first specific function of the vehicle based on the motion recognition; and an outside communication part configured to transmit data to an internet network for performing a second specific function of the vehicle based on the motion recognition.

9. The vehicle control apparatus of claim 1, further comprising:

a face storage part configured to register and store the faces of the one or more persons in advance, the face storage part comprising a portion of or having connectivity to the memory;

a motion storage part configured to register and store motions of the one or more persons having faces stored in advance, based on the faces of the one or more persons, and specific functions associated with the motions, the motion storage part comprising a portion of or having connectivity to the memory; and a memory part configured to:

store programs that, when executed by a processor, facilitate control of the vehicle control apparatus; and store identification information for transmitting data via an outside communication part.

10. The vehicle control apparatus of claim 1, further comprising:

an input part that configured to turn the vehicle control apparatus on and off, input and store a face recognition command, input and store a motion recognition command, and to input information regarding a recipient of data to be transmitted via an internet.

11. The vehicle control apparatus of claim 1, wherein the specific function of the vehicle further comprises one or more of turning on vehicle headlights, turning off vehicle headlights, turning on lamps outside a vehicle, turning off lamps outside the vehicle, turning on lamps inside the vehicle, turning off lamps inside the vehicle, a function for capturing a currently parked location, transmitting a captured image to a mobile phone corresponding to a registered phone number, turning on a vehicle black-box, or turning off a vehicle black-box.

12. The vehicle control apparatus of claim 1, wherein the vehicle control apparatus is configured to add new services by upgrading or updating programs via an internet.

13. A vehicle control method performed by a vehicle control apparatus, the method comprising:

registering, by a storage part, one or more faces of persons associated with a vehicle, the registered one or more faces being stored in a memory;

registering, by the storage part, one or more motions of the one or more persons associated with a vehicle having a registered face, and storing the one or more motions of the one or more persons associated with the vehicle having a registered face in the memory obtaining an image of an area outside the vehicle, by an image obtaining part;

finding a face of a person outside the vehicle, by a face recognizing part, the face of the person outside the vehicle being in the image obtained by the image obtaining part, the face of the person outside the vehicle being identified based on feature elements of human faces;

extracting, by the face recognizing part, feature information regarding the face of the person outside the vehicle;

comparing, by a face authenticating part, the feature information regarding the face of the person outside the vehicle to feature information regarding the one or more faces of persons registered and stored by the storage part in advance;

authenticating, by the face authenticating part, the face of the person outside the vehicle as a registered face, if a first difference between the feature information extracted by the face recognizing part and the feature information regarding the faces of the one or more persons registered in advance is less than or equal to a first critical value;

recognizing, by a motion recognizing part, a motion of the person outside the vehicle if the face of the person outside the vehicle is authenticated as being a registered face when the authentication is completed by the face authenticating part;

comparing, by a control part, the motion recognized by the motion recognizing part to the one or more motions registered and stored by the storage part in advance;

causing, by the control part, a specific function of the vehicle to be performed based on one or more motions stored in advance if a second difference between the motion recognized by the control part and one or more motions stored in advance is greater than a second critical value associated with the second quantifiable difference between the motion recognized by the motion recognizing part and the one or more motions stored in advance, the specific function of the vehicle comprising one or more of opening a vehicle door, closing the vehicle door, opening a vehicle trunk, or closing the vehicle trunk; and requesting, by the motion recognizing part, the person outside the vehicle to show a motion again, if the second quantifiable difference between the motion recognized by the motion recognizing part and the one or more motions stored in advance is less than or equal to the second predetermined critical value.

14. The vehicle control method of claim 13, further comprising:

removing noise from the image obtained by the image obtaining part; and converting the image obtained by the imaging obtaining part to a binary image.

15. The vehicle control method of claim 13, further comprising:

recognizing a change of the face of the person outside the vehicle authenticated as having a registered face or a change of a body motion of the person outside the vehicle authenticated as having a registered face.

16. The vehicle control method of claim 13, further comprising:

finding and tracking faces of a plurality of people outside the vehicle if the image obtained by the image obtaining part includes a plurality of faces; and extracting feature information regarding all of the faces of the plurality of people outside the vehicle;

individually comparing the feature information of all of the faces of the plurality of people outside the vehicle if a plurality of faces are recognized by the face recognizing part in the image obtained by the image obtaining part to the feature information regarding the faces of one or more persons registered in advance; and authenticating all of the faces individually.

17. The vehicle control method of claim 13, wherein each of the recognizing of the face of the person outside the vehicle and the recognizing of the motion of the person outside the vehicle further comprises:

determining whether recognition is successful.

18. The vehicle control method of claim 13, further comprising:

transmitting data to an onboard computer (ECU) via an inside communication part to perform the specific function of the vehicle based on the motion recognition or to an internet via an outside communication part to perform the specific function of the vehicle based on the motion recognition.

19. The vehicle control method of claim 13, wherein the specific function further comprises one or more of turning on vehicle headlights, turning off vehicle headlights, turning on lamps inside the vehicle, turning off lamps inside the vehicle, turning on lamps outside the vehicle, turning off lamps outside the vehicle, a function for capturing a currently parked location and transmitting a captured image to a mobile phone corresponding to a registered phone number, turning on a vehicle black-box, or turning off the vehicle black-box.

* * * * *